April 8, 1958     J. F. ZALESKI     2,830,289
BROAD BAND ECHO BOX
Filed April 2, 1953
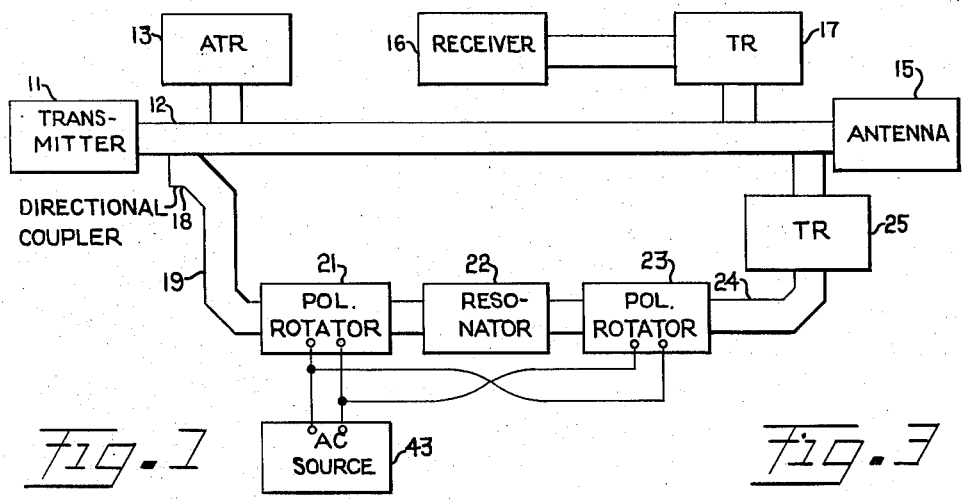
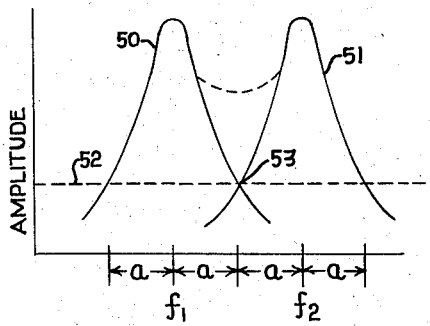
INVENTOR.
JOHN F. ZALESKI
BY
ATTORNEY

United States Patent Office 2,830,289
Patented Apr. 8, 1958

2,830,289

BROAD BAND ECHO BOX

John F. Zaleski, Thornwood, N. Y., assignor to General Precision Laboratory Incorporated, a corporation of New York Application April 2, 1953, Serial No. 346,329

5 Claims. (Cl. 343—17.7)

This invention relates to a signal simulator, or echo box, and more particularly to an echo box which is broad banded and also has a high Q.

An echo box is often used to adjust the receiver of a radar set when no actual radar targets are available. When constructed for such a use, an echo box usually comprises a cavity resonator tuned to the frequency of the radar transmitter. Energy from the radar antenna is fed to the resonator, which starts to oscillate. Since the Q is high, the resonator continues to oscillate, or "ring," for a short time after the end of the transmitter pulse. This oscillatory energy is coupled back to the antenna system and is available as a signal in the receiver.

The cavity resonator of an echo box is usually constructed to have as high a Q as possible so that it will ring for as long as possible with an amplitude as great as possible. Such a construction results in a sharply resonant cavity which will operate satisfactorily only within a narrow band of frequencies. If the frequency of the transmitter drifts appreciably, both the amplitude of the oscillations produced and the ringing time will be greatly reduced. The bandwidth may be increased by reducing the Q of the resonator, but an increase in bandwidth is accompanied by a reduction in amplitude and ringing time.

It is an object of this invention to construct an echo box which will provide a substantial signal even if the transmitter frequency drifts.

Another object of the invention is to provide an echo box usable throughout a wide frequency band.

In accordance with the invention, a cavity resonator with an elliptical cross section is provided. The resonant frequency of such a resonator when excited in the $TE_{11}$ mode depends upon the plane of polarization. The polarization of the wave from the antenna system is continuously rotated and fed to the elliptical cavity. While the resonator is "ringing," wave energy is propagated from the cavity through the same or a second polarization rotator, where the original polarization is restored, back to the antenna system, where it is available as a signal for the receiver. In effect, the resonant frequency of the echo box is swept about the nominal frequency of the transmitter so that any frequency within a wide band is capable of initiating substantial oscillations in the resonator.

For a more complete understanding of the invention reference may be made to the accompanying drawing in which:

Figure 1 is a schematic block diagram showing the invention connected to the antenna waveguide of a radar system.

Figure 2 is a sectional view of the resonator and polarization rotators of Fig. 1.

Figure 3 is a cross sectional view of the resonator taken along the line 3—3 of Fig. 2.

Figure 4 is a cross sectional view of a second embodiment of the invention.

Figure 5 is a graphical representation of the frequency characteristics of the elliptical resonator.

Referring now to Fig. 1 of the drawing, there is shown a signal simulator according to the invention connected to a radar system. The output of a radar transmitter 11 is propagated, in the dominant $TE_{10}$ mode, through a rectangular wave guide 12 to an antenna 15. A radar receiver 16 is connected, through a first TR box 17, to the wave guide 12. An ATR switch 13 is coupled to the wave guide 12 between the transmitter and the junction leading to the receiver 16. A directional coupler 18 is provided to couple a portion of the energy in the wave guide 12 to a branch wave guide 19. This branch wave guide 19 is connected to a first ferromagnetic polarization rotator 21, which will be more fully described subsequently. The polarization rotator 21 rotates the plane of polarization of the incident wave from the wave guide 19, the direction and amount of rotation depending upon the direction and magnitude of the magnetic field applied. After rotation of polarization, the wave is coupled to an elliptical cavity resonator 22, which also will be more fully described subsequently. The resonator 22 is coupled to a second ferromagnetic polarization rotator 23 which restores the original polarization. The second polarization rotator 23 is coupled to a rectangular wave guide 24 which propagates the wave energy to a second TR box which, in turn, is coupled to the wave guide 12 at a point between the antenna 15 and the junction leading to the receiver 16.

Fig. 2 shows a cross sectional view of the resonator 22 and two polarization rotators 21 and 23 of Fig. 1. Polarization rotator 21 may comprise a cylindrical metal sleeve 27 with two integral flanges 28 and 29. These flanges may be used to join the rotator to other microwave components. The space within the cylindrical sleeve 27 is filled with a low-loss dielectric material 31 such as a tetrafluoroethylene resin sold under the trade mark "Teflon." Embedded in the center of the dielectric material 31 on the axis of the sleeve 27 is a ferrite rod 32. This rod may be made of a material known as Ferramic "D" and may be obtained from the General Ceramics and Steatite Corporation, Keasbey, New Jersey. Between the flanges 28 and 29 a coil of wire 33 is wound in order to provide a magnetic field through the rod along the axis of the cylindrical sleeve 27. The details of the polarization rotator are not a part of the invention but one type has been described so that the invention can be more readily understood. One type of polarization rotator which has been found to be satisfactory may be obtained commercially from C. H. Luhrs & Co. and is known as a "Faratron" type 5. Such a polarization rotator will rotate the polarization of a wave by 90° in either direction when the proper magnetic field is applied. Polarization rotator 23 is identical to rotator 21.

Consider a wave guide of elliptical cross section in which the major axis is selected so that the guide will sustain no modes higher than the $TE_{11}$ mode at the frequency range of interest. It is well known that if a cavity resonator of fixed length, formed from a section of such a wave guide, be excited in the $TE_{11}$ mode with the E vector parallel to the major axis, the resonant frequency will depend on the minor axis. Similarly, if such a resonator be excited so that the E vector is parallel to the minor axis, the resonant frequency will depend upon the major axis. Thus it is possible to construct a cavity resonator whose resonant frequency depends upon the polarization of the exciting wave. The resonator 22 comprises a section of wave guide preferably approximately a half wave length long at the nominal frequency of transmitter 11. The cross sectoin of this resonator is shown in Fig. 3 with the ellipticity exaggerated. It is preferable to make the resonator with a very small amount of ellipticity so that oscillations are possible at any frequency between the higher and lower resonant frequencies, as can be understood by reference to Fig. 5.

Fig. 5 is a graphical representation of the amplitude of oscillations of the resonator 22 as a function of exciting frequency. Curve 50 shows the amplitude of oscillations of the resonator when excited by a wave whose E vector is parallel to the minor axis. Curve 51 shows the amplitude of oscillations of the resonator when excited by a wave whose E vector is parallel to the major axis. Dashed line 52 represents the minimum amplitude of oscillations which will produce a usable signal at the receiver. Resonator 22 is preferably designed so that the two curves cross each other at the point 53 where the amplitude of each curve is equal to the minimum usable signal. With this design, a wave whose E vector is parallel to the minor axis will produce a usable signal although its frequency varies from $f_1-a$ to $f_1+a$, as shown in Fig. 5. Similarly, a wave whose E vector is parallel to the major axis will produce a usable signal, although its frequency varies from $f_2-a$ to $f_2+a$. By using polarization rotators as previously described, a usable echo may be obtained when the exciting frequency varies from $f_1-a$ to $f_2+a$. This is approximately twice the bandwidth previously obtainable. As an example, the resonator may be designed with resonant peaks $f_1$ and $f_2$ separated by 30 megacycles so that a usable echo is obtained over a range of 30 megacycles above or below the mean transmitter frequency, or a total bandwidth of 60 megacycles.

The foregoing discussion has assumed that the E vector of the exciting wave was parallel to one or the other axis of the resonator. It has been found that for resonators with a small degree of ellipticity, intermediate polarizations of waves whose frequency is intermediate between $f_1$ and $f_2$ will produce echoes substantially in excess of the minimum usable value.

Referring again to Fig. 2, the resonator 22 comprises an elliptical sleeve 35 and has outer flanges 36 and 37, and inner flanges 38 and 39. The outer flanges may be used to fasten the resonator to other microwave components while the inner flanges form irises 41 and 42. Fig. 1 is a schematic diagram, and, for the sake of clarity, resonator 22 is shown joined to polarization rotators 21 and 23 by short sections of circular wave guide. However, it is actually preferable to join these elements directly as shown in Fig. 2. Resonator 22 should be angularly oriented so that the axes of the elliptical cross section are parallel to the sides of wave guides 19 and 24.

Referring to Fig. 1, the coil 33 of the first rotator 21 is connected to an alternating current source 43 whose frequency is much lower than that of the transmitter. In practice, a source of sine wave power with a frequency of 2500 cycles per second has been found satisfactory for use with a transmitter frequency of the order of 9000 megacycles. This arrangement results in an output wave which may be said to be "polarization modulated." The current through coil 33 should be adjusted so that the peak positive value will rotate the polarization 90° in one direction while the peak negative value will rotate the polarization 90° in the opposite direction. The total change in polarization is therefore 180°. The coil of the second rotator 23 is connected to the same alternating current source 43 but the polarity of the connection is reversed so that when the magnetic field is a maximum from left to right in rotator 21, it is a maximum from right to left in rotator 23.

In operation, a pulse from transmitter 11 passes through wave guide 12, directional coupler 18, wave guide 19, and polarization rotator 21. At an instant when the magnetic field of rotator 21 is at some value between zero and its maximum, the wave will be rotated by some angle θ less than 90°. Resonator 22 will be excited and at the end of the pulse will ring and propagate a wave through rotator 23. The magnetic field in rotator 23 will be the same value as that in rotator 21 but in the opposite direction. Therefore, the wave will be rotated through the same angle θ but in the opposite direction and will immerge into wave guide 24 with the same polarization as the wave in wave guide 19. This wave will be propagated through TR box 25, wave guide 12, and TR box 17 to receiver 16. The wave from resonator 22 will also be propagated through polarization rotator 21 but directional coupler 18 and ATR box 13 will prevent this wave from reaching the receiver. In an actual embodiment it was found possible to obtain usable echoes when the frequency of the transmitter varied as much as 30 megacycles above and below its mean value of 9000 megacycles.

Referring now to Fig. 4, there is shown a section of wave guide 12 at the point where TR box 25 joins it in Fig. 1. However, in the modification of Fig. 4, in place of TR box 25 there is connected a section of rectangular wave guide 44. To this wave guide is connected a polarization rotator 45 which may be identical to polarization rotator 21. The winding 46 of rotator 45 is connected to a source 47 of alternating current. The current through winding 46 is preferably adjusted so that the peak positive value will rotate the polarization 90° in one direction while the peak negative value will rotate the polarization 90° in the opposite direction. To the other end of rotator 45 there is coupled an elliptical cavity resonator 48 which is similar to resonator 22 except that it is closed at one end. The resonator should be angularly oriented so that the axes are parallel to the sides of wave guide 44. In the operation of this embodiment, a pulse from the transmitter is propagated along wave guide 12, through iris 49 and wave guide 44 to rotator 45. If the magnetic field is a maximum at the moment the pulse is incident upon rotator 45, the polarization will be shifted by 90°, and the cavity will be resonant at one of its resonant peaks. The wave will excite cavity 48 and at the end of the pulse cavity 48 will ring and propagate a wave back through rotator 45. Although the magnetic field remains unchanged, the direction of propagation is reversed and the polarization will be shifted another 90° in the same direction. Therefore, the reflected wave entering wave guide 44 has the same polarization as the transmitted pulse since there has been a total polarization rotation of 180°. If the pulse from the transmitter arrives at a time when the magnetic field is zero, there will of course be no polarization rotation and the cavity will be resonant at its other resonant peak. If the magnetic field is at some intermediate value the total rotation through the rotator 45 in both directions will be less than 180° and transmission of the wave to the receiver will be less efficient than in the modification shown in Fig. 1. However, the arrangement of Fig. 4 has been found to give adequate echo signal strength in most cases and is preferred for many applications because of its simplicity.

The invention has been described with respect to two preferred embodiments. However, modifications may be made within the scope of the invention. Any type of resonator may be used which has two or more resonant frequencies, dependent upon the polarization of the applied wave. For example, the resonator may comprise a section of coaxial line in which the outer conductor is elliptical in cross section and which will support the $TE_{11}$ coaxial mode with polarization perpendicular to either the major or minor axis. The polarization rotator may be of any type in which the degree of polarization may be readily controlled.

In the embodiment of Fig. 1, a polarization rotator whose maximum rotation is plus or minus 45° could be used. In this case, it would be preferable to orient the elliptical axes of resonator 22 so that they make angles of 45° with the sides of wave guides 19 and 24. Ferromagnetic polarization rotators in which the magnetic field is perpendicular to the direction of wave propagation have been constructed and can be used in the present invention. It would also be possible to omit the separate polarization rotator and to mechanically rotate the resonator. However, the embodiments described are to be preferred because of the mechanical difficulties involved in rotating a resonator at high speeds. Many other modifications will occur to those skilled in the art.

What is claimed is:

1. An echo box adapted to be coupled to the antenna system of a radar set comprising, a cavity resonator having an elliptical cross section whose resonant frequency depends upon the plane of polarization of its applied wave, on electromagnetic polarization rotator coupled to said resonator and adapted to be coupled to said antenna system for continuously varying the rotation of the polarization of the wave applied to said resonator.

2. An echo box to be used with a radar set for supplying a signal to the radar receiver during the intervals between transmitted pulses comprising an elliptical cavity resonator having a first resonant frequency when excited by a wave having its E vector parallel to the major axis of the resonator and a second resonant frequency when excited by a wave having its E vector parallel to the minor axis of the resonator, a ferromagnetic polarization rotator including a winding for establishing a magnetic field parallel to its axis, said rotator being capable of rotating the plane of polarization of a wave through an angle which varies as the magnitude and direction of the magnetic field is varied, an alternating current source connected to said winding, means for coupling said polarization rotator to said resonator and means for coupling said polarization rotator to the antenna system of said radar set.

3. An echo box for use with a radar set for supplying a signal to the radar receiver during the intervals between transmitted pulses comprising, a first ferromagnetic polarization rotator, including a magnetizing winding, coupled to the antenna system of said radar set; an elliptical cavity resonator coupled to said first rotator; a second ferromagnetic polarization rotator, including a magnetizing winding, coupled to said resonator and to said antena system; an alternating current source; and means for connecting said source to said windings in opposite polarity.

4. An echo box comprising, a cavity resonator having an elliptical cross section and an electromagnetic polarization rotator connected to said resonator for coupling wave energy to said resonator and for continuously varying the angle between the plane of polarization of the applied wave and an axis of the cross section of said resonator.

5. An echo box comprising, a cavity resonator having an elliptical cross section and having a first resonant frequency when excited by a wave having a first plane of polarization and a second resonant frequency when excited by a wave having a second plane of polarization, and an electromagnetic polarization rotator connected to said resonator for the dual purpose of coupling said resonator to an external circuit and for continuously varying the rotation of the plane of polarization of wave energy passing through said rotator.

References Cited in the file of this patent

UNITED STATES PATENTS

| | | |
|---|---|---|
| 2,476,034 | Fox | July 12, 1949 |
| 2,502,456 | Hansen | Apr. 4, 1950 |
| 2,537,139 | Kannenberg et al. | Jan. 9, 1951 |
| 2,632,808 | Lawson | Mar. 24, 1953 |
| 2,644,930 | Luhrs | July 7, 1953 |
| 2,704,830 | Rosencrans | Mar. 22, 1955 |